US012581027B2

(12) United States Patent
Kim

(10) Patent No.: US 12,581,027 B2
(45) Date of Patent: Mar. 17, 2026

(54) DISPLAY DEVICE

(71) Applicant: LG ELECTRONICS INC., Seoul (KR)

(72) Inventor: Gihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 245 days.

(21) Appl. No.: 18/372,524

(22) Filed: Sep. 25, 2023

(65) Prior Publication Data

US 2024/0340387 A1 Oct. 10, 2024

(30) Foreign Application Priority Data

Apr. 5, 2023 (KR) ........................ 10-2023-0044884

(51) Int. Cl.
| | |
|---|---|
| *H04N 5/645* | (2006.01) |
| *G02F 1/1333* | (2006.01) |
| *G06F 1/16* | (2006.01) |

(52) U.S. Cl.
CPC ........... *H04N 5/645* (2013.01); *G02F 1/1333* (2013.01); *G06F 1/1637* (2013.01)

(58) Field of Classification Search
CPC .... G06F 1/1637; G06F 1/1656; G06F 1/1601; H04N 5/645; G02F 2201/46
See application file for complete search history.

(56) References Cited

U.S. PATENT DOCUMENTS

| | | | | |
|---|---|---|---|---|
| 8,896,991 | B2* | 11/2014 | Ternus | ................ H04M 1/0277 |
| | | | | 361/679.55 |
| 2014/0126125 | A1* | 5/2014 | Yamamoto | ............ F16M 11/04 |
| | | | | 361/679.01 |
| 2018/0180929 | A1* | 6/2018 | Kim | .................. G02F 1/133308 |
| 2019/0166704 | A1* | 5/2019 | Shin | .................... H05K 5/0217 |

FOREIGN PATENT DOCUMENTS

| | | |
|---|---|---|
| KR | 1020230036884 | 3/2023 |
| KR | 1020230111999 | 7/2023 |
| KR | 1020240009218 | 1/2024 |

OTHER PUBLICATIONS

Korean Intellectual Property Office Application No. 10-2023-0044884, Notice of Allowance dated Aug. 9, 2024, 9 pages.

* cited by examiner

*Primary Examiner* — Sagar Shrestha
*Assistant Examiner* — Peter Krim
(74) *Attorney, Agent, or Firm* — LEE, HONG, DEGERMAN, KANG & WAIMEY

(57) ABSTRACT

Disclosed herein is a display device may include a display panel, an inner plate formed of a metal material and disposed on a rear surface of the display panel, a wireless communication module mounted on a rear surface of the inner plate, a cover bottom arranged to cover the wireless communication module and coupled to the rear surface of the inner plate, and a cover rear arranged to cover the cover bottom and coupled to the rear surface of the inner plate, the cover rear containing a conductive material. The cover bottom (Continued)

may include a common part disposed on a rear surface of the wireless communication module, the common part containing a non-conductive material, and a metallic part coupled to both sides of the common part and extending to a lateral end of the display panel. The display device may improve EMI protection without interfering with wireless communications.

13 Claims, 13 Drawing Sheets

200

220

210

220

(a)

(b)

(a)

(b)

DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2023-0044884, filed on Apr. 5, 2023, the contents of which are hereby incorporated by reference herein in its entirety.

BACKGROUND OF THE DISCLOSURE

Field

The present disclosure relates to a display device with improved EMI protection without interfering with wireless communication.

Discussion of the Related Art

With growth of information society, demand for various display devices has increased. In order to satisfy such demand, in recent years, a liquid crystal display (LCD), a field emission display (FED), a plasma display panel (PDP), and an electroluminescent device have been developed as display devices.

A liquid crystal panel of the liquid crystal display includes a liquid crystal layer and a TFT substrate and a color filter substrate opposite each other in the state in which the liquid crystal layer is interposed therebetween, wherein a picture is displayed using light provided from a backlight unit.

An active matrix type organic light-emitting display has come onto the market as an example of the electroluminescent device. Since the organic light-emitting display is self-emissive, the organic light-emitting display has no backlight, compared to the liquid crystal display, and has merits in terms of response time and viewing angle, and therefore the organic light-emitting display has attracted attention as a next-generation display.

Recently, materials such as OLEDs, which are self-illuminating without a backlighting structure on the backside, have allowed for the realization of bendable display modules, enabling the realization of curved display devices. The thickness of the display device may be reduced, and therefore various components must be mounted in a limited space.

The display device is capable of receiving image information and control signals through wireless communication as well as wired communication. In particular, short-range wireless communication functions such as Bluetooth and Wi-Fi are required to connect with terminals located at a short distance.

Wireless communication is affected by surrounding metal devices, and therefore a part made of a non-conductive material is required for wireless communication. However, polymer resin is employed as a non-conductive material, and it is not easy to control the shrinkage and expansion of the resin due to the influence of temperature and humidity according to the usage environment. The resin may be subjected to warping and chemical cracking after undergoing thermal deformation. Further, the resin is vulnerable to external shocks due to its low rigidity compared to metal.

In addition, a case structure made of a non-conductive material is required, but an electromagnetic interference (EMI) prevention structure to prevent noise caused by static electricity or the introduction of external electricity requires a conductive material. It is difficult to satisfy these two contrasting conditions.

SUMMARY

An object of the present disclosure devised to solve the problems above is to provide a display device having an improved EMI prevention effect without interfering with wireless communication by configuring a cover bottom with a non-metallic part and a metallic part.

To achieve these objects and other advantages and in accordance with the purpose of the disclosure, as embodied and broadly described herein, a display device may include a display panel, an inner plate formed of a metal material and disposed on a rear surface of the display panel, a wireless communication module mounted on a rear surface of the inner plate, a cover bottom arranged to cover the wireless communication module and coupled to the rear surface of the inner plate, and a cover rear arranged to cover the cover bottom and coupled to the rear surface of the inner plate, the cover rear containing a conductive material. The cover bottom may include a common part disposed on a rear surface of the wireless communication module, the common part containing a non-conductive material, and a metallic part coupled to both sides of the common part and extending to a lateral end of the display panel.

The metallic part may include a first coupling part arranged to overlap the common part, and the display device may further include a screw fastened to the common part through the cover rear and the first coupling part.

The metallic part may include a first coupling groove recessed to have a depth corresponding to the first coupling part, and a first retaining hole formed on an inner side of the first coupling groove and allowing an end of the first coupling part to be inserted thereinto. The first coupling part may slide along the first coupling groove in a first direction until the end of the first coupling part is inserted into the first retaining hole, such that the first coupling part is coupled with the first coupling groove.

The first coupling part may include a screw hole allowing the screw to be inserted thereinto, a pair of first retaining protrusions positioned to face in a first direction with respect to the screw hole and protruding in a vertical direction, and a guide slope extending from the pair of first retaining protrusions towards the end of the first coupling part. The first retaining protrusions may be caught in the first coupling groove to prevent the first coupling part from being separated from the first coupling groove.

The display device may further include an elastic slot extending from the screw hole to a position between the pair of first retaining protrusions, and a gap in the elastic slot may be narrowed when the first retaining protrusions are inserted into the first retaining hole.

The metallic part may include a second coupling part arranged to overlap the common part, and the common part may include a second coupling groove allowing a top and bottom of the second coupling part to be inserted thereinto. The first coupling groove may be open in a rearward direction, and the second coupling groove may be open in a forward direction.

The first coupling part may further include a clip portion protruding rearward to contact the cover rear.

The metallic part may include a second coupling part arranged to overlap the common part. The common part may include a second coupling groove allowing a top and bottom of the second coupling part to be inserted thereinto, and a coupling rail formed on an upper and lower side of the second coupling groove to allow top and bottom of the second coupling part to be movably inserted thereinto.

The display device may further include a second retaining protrusion protruding from the second coupling groove in a thickness direction.

The second coupling part may include a second retaining hole allowing the second retaining protrusion to be inserted thereinto.

The metallic part may include a rear part disposed inside the cover rear, a bottom part arranged to cover a lower end of the display device, and a support protrusion comprising irregularities protruding forward from the rear part. The support protrusion may include a plurality of support protrusions formed on the metallic part.

A vertical length of first portions of the rear part having the support protrusion may be greater than a vertical length of a second portion the rear part positioned between the first portions.

The display device may further include a third fastening protrusion protruding from the bottom part and arranged to overlap the common part.

The wireless communication module may include at least one of a Bluetooth or Wi-Fi communication module configured to perform short-range wireless communication.

By implementing the cover bottom in an assembly structure, the display device of the present disclosure may improve the EMI prevention effect without interfering with wireless communication.

In addition, the assembly structure including a common part and a variable part of the cover rear allows the common part to be used for various models and the variable part to be replaced to apply to various models.

In addition, as the cover rear contains a metal material, the cover rear is effective in improving the overall rigidity of the display device, and the conventionally support protrusion for enhancing the rigidity when combined with the bottom stand may be omitted.

Further, by applying metal materials compared to the existing structure, improvement may be achieved in terms of dimensional changes due to temperature and humidity effects, and improvement may be achieved in terms of thermal deformation-related distortion and chemical cracking.

The effects obtainable from the present disclosure are not limited to those mentioned above, and other effects not mentioned will be apparent to one having ordinary skill in the art from the following description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
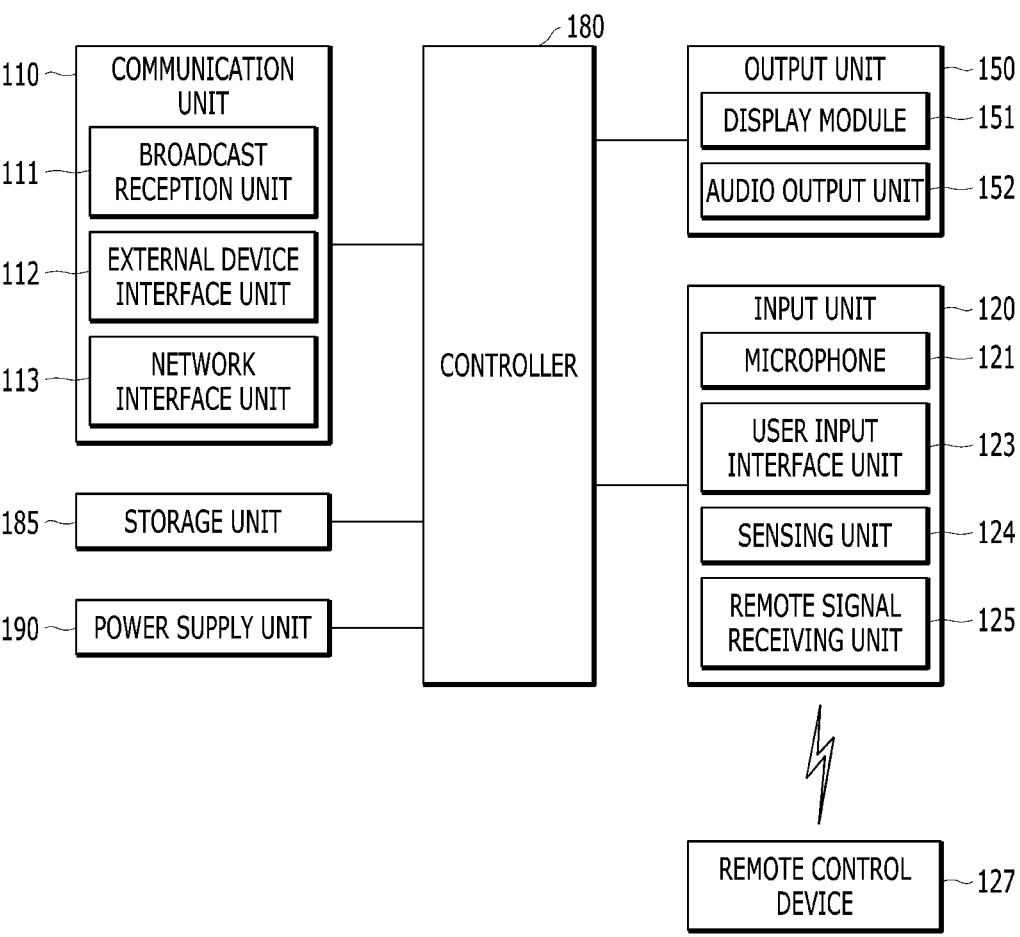
FIG. 1 is a block diagram illustrating components of a display device according to the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Meanwhile, an image display device described in this specification is, for example, an intelligent image display device having a computer supporting function in addition to a broadcast reception function, wherein an Internet function may be added while the broadcast reception function is devotedly performed, whereby an interface that is more conveniently used, such as a handwriting type input device, a touchscreen, or a space remote control, may be provided. In addition, the image display device may be connected to the Internet or a computer through support of a wired or wireless Internet function, whereby various functions, such as e-mail, web browsing, banking, or gaming, may be executed. For such various functions, a standardized general-purpose OS may be used.

In the image display device described in the present disclosure, therefore, various applications may be freely added or deleted, for example, on a general-purpose OS kernel, whereby various user friendly functions may be executed. More specifically, the image display device may be a network TV, an Hbb TV, or a smart TV, and is applicable to a smartphone depending on circumstances.

FIG. 1 is a block diagram illustrating components of a display device 100.

The display device 100 may include a communication unit 110, an input unit 120, a sensing unit 124, an output unit 150, a controller 180, a storage unit 185, and a power supply 190. The configuration shown in FIG. 1 may include only some of the components, and one configuration may perform two functions.

The communication unit 110 may include a broadcast reception unit 111 including a tuner unit and a demodulator. The tuner unit of the broadcast reception unit 111 may select a broadcast signal corresponding to a channel selected by a user or any one of all pre-stored channels, among broadcast signals received through an antenna (not shown) or a cable (not shown). The tuner unit 111 may convert the selected broadcast signal into an intermediate frequency signal or a baseband video or audio signal.

The tuner unit may sequentially select broadcast signals of all broadcast channels stored through a channel memory function, among received broadcast signals, and may convert each of the selected broadcast signals into an intermediate frequency signal or a baseband video or audio signal The demodulation unit of the broadcast reception unit 111 may receive the digital IF (DIF) signal converted by the tuner unit, and may perform demodulation. After performing demodulation and channel decryption, the demodulation unit may output a stream signal (TS). At this time, the stream signal may be a multiplexed image, audio, or data signal.

The stream signal output from the demodulation unit may be input to the controller 180. After performing demultiplexing and image/audio signal processing, the controller 180 may output an image through the display module 151, and may output audio through the audio output unit 152.

An external device interface unit 112 may connect an external device to the display device 100 to receive an image signal, an audio signal, and a control signal from the external device. The interface unit 112 may be connected by wire/wireless to external devices such as a Digital Versatile Disk (DVD), a Blu-ray, a game device, a camera, a camcorder, a computer (laptop), and the like.

The external device interface unit 112 transmits video, audio, or data signals inputted externally to the controller 180 of the display device 100 through the connected external device. In addition, the video, audio, or data signals processed by the controller 180 may be outputted to the connected external device.

The external device interface unit 112 may include a wired type and a wireless type. The wired type includes a physical terminal provided to the display device 100, and the wireless type may be connected to an external device through an antenna that receives a wireless signal.

The wired type may include a USB terminal, a Composite Video Banking Sync (CVBS) terminal, a component terminal, an S-video terminal (analog), a Digital Visual Interface (DVI) terminal, a High Definition Multimedia Interface (HDMI) terminal, an RGB terminal, a D-SUB terminal, and so on.

The wireless type may perform short-range wireless communication with other electronic devices located nearby. The display device 100 may be connected to other electronic devices via networks according to communication standards such as Bluetooth, Radio Frequency Identification (RFID), Infrared Data Association (IrDA), Ultra Wideband (UWB), ZigBee, Digital Living Network Alliance (DLNA), etc.

The network interface unit 113 may access a prescribed web page through a connected network or another network linked to the connected network. That is, the network interface unit 113 may transmit and receive data with a corresponding server by accessing the prescribed web page through the network. In addition, the network interface unit 113 may receive contents or data provided by a content provider or a network operator.

That is, contents such as movies, advertisements, games, VODs, and broadcast signals provided from content providers or network providers and information related to such contents may be received through the network. In addition, update information and update files of firmware provided by the network operator may be received. In addition, data may be transmitted to the Internet or content provider or network operator.

In addition, the network interface unit 113 may select a desired application from applications opened to the public and receive the selected application through the network.

According to an embodiment, when a game application is executed in the display device, the network interface unit 113 may transmit or receive prescribed data to or from a user terminal connected to the display device via the network. Also, prescribed data may be transmitted or received with a server that stores game scores The input unit 120 may include a microphone 121 that collects sound, a user input unit 123 that detects a user's command, a sensor unit that senses a state and surrounding state of the display device, and a remote signal reception unit 125 that receives a signal of a remote controller 127.

The microphone 121 may recognize a user's voice or surrounding sound, and in particular, receive a user's voice and process it as electrical audio data. Various noise cancellation algorithms for removing noise generated in the process of receiving an external audio signal may be implemented in the microphone 121.

The microphone 121 may simply collect user's voice, convert the collected voice into audio data, and store it in the storage unit 185 or transmit it to the external device via the communication unit 110, and may also perform a function as the user input unit 123 in a manner of analyzing the audio data and recognizing it as a user command.

In addition to the main body of the display device 100, the microphone 121 may be mounted on the remote controller 127, which will be described later, and the corresponding audio data may be forwarded to the controller 180 through the remote signal reception unit 125.

The user input unit 123 is a device to which a user inputs a control command for controlling the display device. The user input unit 123 may include a keypad, a button, a touch pad, a touch screen, etc.

When the user input unit 123 includes a hard key button, a user may input a command related to the display device 100 through a push operation of the hard key button. When the user input unit 123 is provided with a touchscreen, the user may input a command related to display device 100 to remote controller 127 by touching the soft key of the touchscreen.

In addition, the user input unit 123 may include various types of input means that the user can operate, such as a scroll key, a jog key, etc., and the present embodiment does not limit the scope of the right of the present disclosure.

Recently, as the size of a bezel of the display device 100 decreases, the display device 100 tends to minimize the user input unit 123 of the physical button type exposed externally. Instead, a minimum physical button is located on a rear side or a lateral side, and a user input may be received from a touchpad or the remote controller 127 through a remote signal reception unit 125 that will be described later.

The remote signal reception unit 125 may input a command related to the display device 100 through the remote controller 127 having the user input unit 123. The remote signal reception unit 125 is a sort of the user input unit 123 and may belong to a wireless communication unit because it receives signals from the remote controller 127 according to various communication methods such as Radio Frequency (RF) communication method, Infrared (IR) communication method, etc.

The sensing unit 124 refers to a device that detects a change in the display device 100 or an external change. For example, the sensing unit 124 may include at least one of a proximity sensor, an illumination sensor, a touch sensor, an Infrared (IR) sensor, an ultrasonic sensor, an optical sensor (e.g., a camera), a voice sensor (e.g., a microphone), a battery gauge, an environment sensor (e.g., a hygrometer, a thermometer, etc.), and the like.

Recently, a display device 100 that can move or change a direction of a display has emerged, and a gyro sensor, an acceleration sensor and the like may be provided to detect a posture of the display device.

Based on the information collected by the sensing unit 124, the controller 180 may check the state of the display device 100 and notify a user of a problem when the problem occurs or adjust it by itself, thereby controlling the display device 100 to maintain a best state.

In addition, the content, image quality, and size of an image provided to the display module 151 may be controlled differently depending on a viewer, a surrounding illumination and the like sensed by the sensing unit 124, thereby providing an optimal viewing environment. As smart TVs advance, functions mounted on the display device increase, and the sensing unit 124 is also increasing correspondingly.

The output unit 150 is a device that provides visual and auditory information to a user through the display device, and may include the display module 151 and the audio output unit 152.

The display module 151 may convert an image signal, a data signal, an OSD signal, and a control signal processed by the controller 180 or an image signal, a data signal, and a control signal received from the interface unit to generate a driving signal. The display module 151 may include a display panel having a plurality of pixels.

Each of the plurality of pixels in the display panel may include RGB subpixels. Alternatively, each of the plurality of pixels in the display panel may include RGBW subpixels. The display module 151 may convert an image signal, a data signal, an OSD signal, and a control signal processed by the controller 180 to generate a driving signal for the plurality of pixels.

A plasma display panel (PDP), a liquid crystal display (LCD), an organic light-emitting diode (OLED), or a flexible display may be used as the display module 151, and a 3D display may also be used. The 3D display 130 may be classified as a non-glasses type display or a glasses type display.

The display device 100 includes a display module 151, which occupies a major portion of the front surface thereof, and a case configured to cover the rear surface and the side surface of the display module 151, the case being configured to package the display module 151.

In recent years, the display device 100 has used a flexible display module 150, such as light-emitting diodes (LED) or organic light-emitting diodes (OLED), in order to implement a curved screen. The display module 151 is available.

Light is supplied to an LCD, which was mainly used conventionally, through a backlight unit, since the LCD is not self-emissive. The backlight unit is a device that supplies light emitted from a light source to a liquid crystal uniformly located in front thereof. As the backlight unit has been gradually thinned, a thin LCD has been implemented. However, it is difficult to implement the backlight unit using a flexible material. If the backlight unit is curved, it is difficult to supply uniform light to the liquid crystal, whereby the brightness of a screen is changed.

In contrast, the LED or the OLED may be implemented so as to be curved, since an element constituting each pixel is self-emissive, and therefore no backlight unit is used. In addition, since each element is self-emissive, the brightness of the element is not affected even though the positional relationship between adjacent elements is changed, and therefore it is possible to implement a curved display module 150 using the LED or the OLED.

An organic light-emitting diode (OLED) panel appeared in earnest in mid-2010 and has rapidly replaced the LCD in the small- or medium-sized display market. The OLED is a display manufactured using a self-emissive phenomenon of an organic compound in which the organic compound emits light when current flows in the organic compound. The response time of the OLED is shorter than the response time of the LCD, and therefore afterimages hardly appear when video is implemented.

The OLED is an emissive display product that uses three fluorescent organic compounds having a self-emissive function, such as red, green, and blue fluorescent organic compounds and that uses a phenomenon in which electrons injected at a negative electrode and a positive electrode and particles having positive charges are combined in the organic compounds to emit light, and therefore a backlight unit, which deteriorates color, is not needed.

A light-emitting diode (LED) panel is based on technology of using one LED element as one pixel. Since it is possible to reduce the size of the LED element, compared to a conventional device, it is possible to implement a curved display module 150. The conventional device, which is called an LED TV, uses the LED as a light source of a backlight unit that supplies light to the LCD, and therefore the LED does not constitute a screen.

The display module includes a display panel and a coupling magnet, a first power supply, and a first signal module located at a rear surface of the display panel. The display panel may include a plurality of pixels R. G, and B. The plurality of pixels R, G, and B may be formed at intersections between a plurality of data lines and a plurality of gate lines. The plurality of pixels R. G, and B may be disposed or arranged in a matrix form.

For example, the plurality of pixels R, G, and B may include a red subpixel 'R', a green subpixel 'G', and a blue subpixel 'B'. The plurality of pixels R, G, and B may include a white subpixel 'W'.

The side of the display module 150 on which a picture is displayed may be referred to as a front side or a front surface. When the display module 150 displays the picture, the side of the display module 150 from which the picture cannot be viewed may be referred to as a rear side or a rear surface. Meanwhile, the display module 150 may be constituted by a touchscreen, whereby an input device may also be used in addition to an output device.

The audio output unit 152 receives an audio signal processed by the controller 180 and outputs the same as audio.

The controller 180 may include at least one processor, and may control the overall operation of the display device 100 using the processor included therein. Here, the processor may be a general processor, such as a central processing unit (CPU). Of course, the processor may be a dedicated device, such as an ASIC, or another hardware-based processor.

The controller 180 may demultiplex a stream input through the tuner unit, the demodulation unit the external device interface unit 112, or the network interface unit 113, or may process demultiplexed signals to generate and output a signal for image or audio output.

An image signal processed by the controller 180 may be input to the display module 151, which may display an image corresponding to the image signal. In addition, the image signal processed by the controller 180 may be input to an external output device through the external device interface unit 112.

An audio signal processed by the controller 180 may be output through the audio output unit 152. In addition, the audio signal processed by the controller 180 may be input to an external output device through the external device interface unit 112. Although not shown in FIG. 2, the controller 180 may include a demultiplexing unit and an image processing unit.

Further, the controller 180 may control the overall operation of the display device 100. For example, the controller 180 may control the tuner unit such that a broadcast corresponding to a channel selected by a user or a pre-stored channel is tuned.

In addition, the controller 180 may control the display device 100 according to a user command input through the user input interface unit or an internal program. Meanwhile, the controller 180 may control the display module 151 to display an image. At this time, the image displayed on the display module 151 may be a still image or video, or may be a 2D image or a 3D image.

Meanwhile, the controller 180 may perform control such that a predetermined 2D object is displayed in an image displayed on the display module 151. For example, the object may be at least one of a connected web screen (newspaper or magazine), an electronic program guide (EPG), various menus, a widget, an icon, a still image, video, and text.

Meanwhile, the controller 180 may modulate and/or demodulate a signal using an amplitude shift keying (ASK) method. Here, the amplitude shift keying (ASK) method may be a method of changing the amplitude of a carrier depending on a data value to modulate a signal or restoring an analog signal to a digital data value depending on the amplitude of a carrier.

For example, the controller 180 may modulate an image signal using the amplitude shift keying (ASK) method, and may transmit the modulated image signal through a wireless communication module.

For example, the controller 180 may demodulate and process an image signal received through the wireless communication module using the amplitude shift keying (ASK) method.

As a result, the display device 100 may easily transmit and receive a signal to and from another image display device disposed adjacent thereto without using a unique identifier, such as a media access control (MAC) address, or a complicated communication protocol, such as TCP/IP.

Meanwhile, the display device 100 may further include a photographing unit (not shown). The photographing unit may photograph a user. The photographing unit may be implemented by one camera: however, the present disclosure is not limited thereto. The photographing unit may be implemented by a plurality of cameras. Meanwhile, the photographing unit may be embedded in the display device 100 above the display module 151, or may be separately disposed. Image information photographed by the photographing unit may be input to the controller 180.

The controller 180 may recognize the location of a user based on an image captured by the photographing unit. For example, the controller 180 may recognize the distance between the user and the display device 100 (z-axis coordinate). Further, the controller 180 may recognize an x-axis coordinate and a y-axis coordinate in the display module 151 corresponding to the location of the user.

The controller 180 may sense user gesture based on the image captured by the photographing unit, a signal sensed by the sensor unit, or a combination thereof.

The storage unit 185 may store programs for signal processing and control in the controller 180, and may store a processed image, audio, or data signal. For example, the storage unit 185 may store application programs designed to execute various tasks that can be processed by the controller 180, and may selectively provide some of the stored application programs in response to request of the controller 180.

Programs stored in the storage unit 185 are not particularly restricted as long as the programs can be executed by the controller 180. The storage unit 185 may temporarily store an image, audio, or data signal received from an external device through the external device interface unit 171. The storage unit 185 may store information about a predetermined broadcast channel through a channel memory function, such as a channel map.

FIG. 1 shows an embodiment in which the storage unit 185 and the controller 180 are separately provided: however, the present disclosure is not limited thereto. The storage unit 185 may be included in the controller 180.

The storage unit 185 may include at least one of a volatile memory (e.g., DRAM, SRAM, or SDRAM), a nonvolatile memory (e.g., flash memory), a hard disk drive (HDD), and a solid-state drive (SSD).

The power supply 190 may supply power to the components of the display device 100. In particular, the power supply may supply power to the controller 180, which may be implemented in the form of a system on chip (SOC), the display module 150 for image display, and the audio output unit 160 for audio output.

Specifically, the power supply 190 may include an AC/DC converter (not shown) configured to convert AC power into DC power and a DC/DC converter (not shown) configured to convert the level of the DC power.

The power supply 190 serves to distribute power supplied from the outside to the respective components of the display device. The power supply 190 may be directly connected to an external power supply in order to supply AC power, or may include a battery so as to be used by charging.

In the former case, a cable is used, and the power supply is difficult to move or the movement range of the power supply is limited. In the latter case, the power supply is free to move, but the weight of the power supply is increased in proportion to the weight of the battery, the volume of the power supply is increased, and, for charging, the power supply must be directly connected to a power cable or must be coupled to a charging holder (not shown) that supplies power for a predetermined time.

The charging holder may be connected to the display device through a terminal exposed to the outside, or the battery mounted in the power supply may be charged in a wireless manner when the power supply approaches the charging holder.

Meanwhile, the block diagram of the display device 100 shown in FIG. 1 is for an embodiment of the present disclosure, and elements of the block diagram may be integrated, added, or omitted depending on specifications of an actually implemented display device 100.

That is, two or more elements may be integrated into one element, or one element may be divided into two or more elements, as needed. In addition, the function performed by each block is for describing the embodiment of the present disclosure, and the specific operations and components thereof do not limit the scope of rights of the present disclosure.

Figure 2:
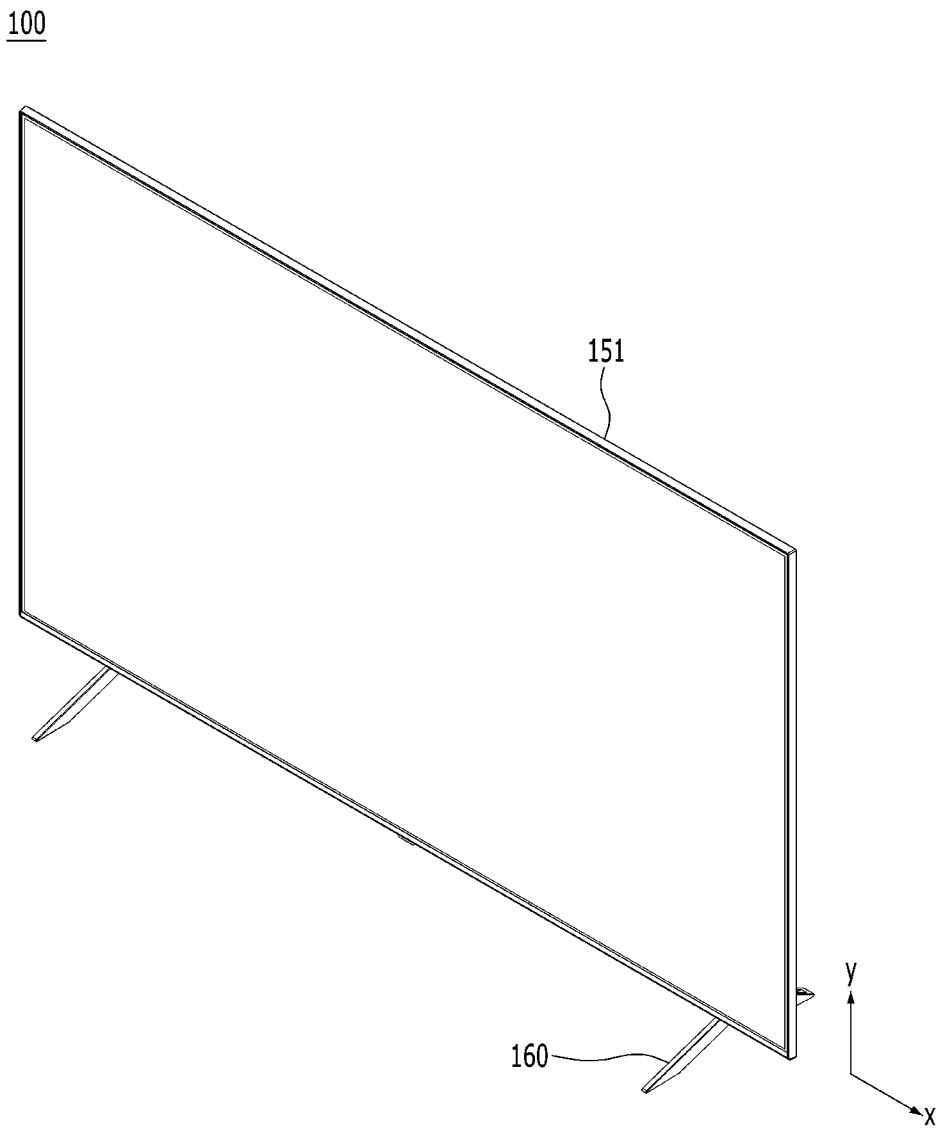
FIG. 2 is a front view according to one embodiment of a display device of the present disclosure.
Figure 3:
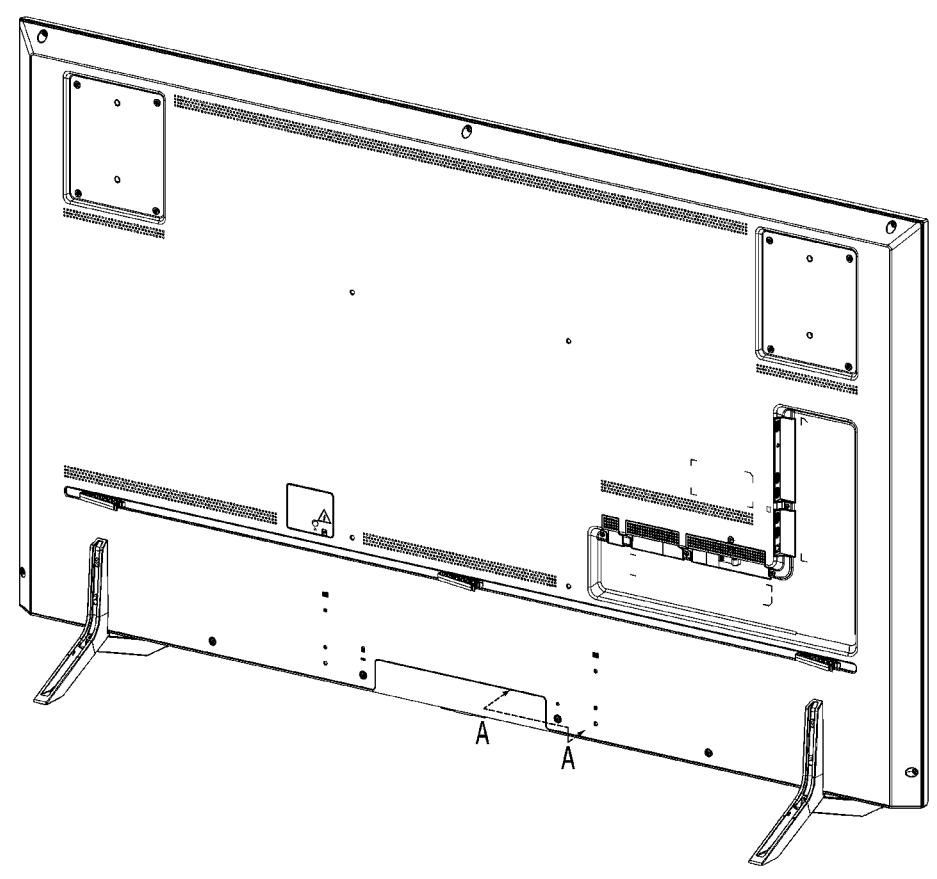
FIG. 3 is a rear view according to one embodiment of the display device of the present disclosure.

FIG. 2 is a front view according to one embodiment of a display device 100 of the present disclosure, and FIG. 3 is a rear view according to one embodiment of the display device 100 of the present disclosure.

The display device 100 of the present disclosure may have a rectangular-shaped body including a pair of long sides and a pair of short sides.

Although long sides extending in the horizontal direction and short sides extending in the vertical direction are shown in the figures, the long sides and short sides may be of equal length, or the long sides may be arranged in the vertical direction.

For simplicity, the description is based on an embodiment in which the sides extending in the horizontal direction (x-axis direction) are long sides and the sides extending in the vertical direction (y-axis direction) are short sides. However, as described above, the description is not limited thereto.

The side on which the display device 100 displays images may be referred to as the front or front side. When the display device 100 displays an image, the side on which the image cannot be observed may be referred to as the rear or rear side.

Recently, the size of the non-display area positioned around the display area of the screen of the display panel 151 has become smaller, resulting in a smaller bezel and a larger ratio of the screen to the size of the display device 100. Bezel-less designs that appear to have almost no bezels are also becoming available, and the size of the display device 100 is being minimized.

Referring to FIG. 3, the back structure of the display device 100 has also been simplified, and the rear surface has become thinner. In order to realize a rear surface of uniform height without any specific protrusion, various parts should be mounted within a limited space on the rear surface of the display panel 151, and therefore it is important to utilize space inside the display device 100.

Recently, the display device 100 capable of transmitting and receiving data by incorporating wireless communication technology rather than a wired method has emerged in order to secure mobility and convenience of connection. In particular, short-range wireless communication technology is being incorporated into the wired display device 100 to connect with various peripheral devices.

Wi-Fi and Bluetooth are used as representative short-range wireless communication technologies, and the number of display devices 100 equipped with wireless communication modules 115 capable of such short-range wireless communication is increasing.

As the display device 100 becomes thinner, the constraints on the installation space have been reduced. In addition, the display device 100 can be connected to various terminals by wireless communication, and thus can be mounted and used at various locations, beyond the traditional installation method of mounting on the wall.

Therefore, the design of the rear surface of the display device 100 has also become an important part of the appearance of the display device 100. Also, the rear surface may be covered with a cover rear 102 formed of a single member in consideration of the design aspect.

The cover rear 102 may be formed of a metal material for rigidity of the structure of the thin display device 100 and for the appearance design. In particular, when the cover rear 102 is metal, it is easy to protect against external electrical impacts such as static electricity, and the cover rear 102 can be used as a ground.

However, as described above, when wireless communication technology is incorporated and wireless signals are transmitted and received, the metal case interferes with radio waves. For wireless communication, at least a portion of the case should be composed of a non-metallic material.

The display device 100 on the front side may further include an inner plate 104 made of metal on the rear surface of the display panel 151 for rigidity, with conductive electrodes arranged in a grid. Therefore, the front side where the display panel 151 is located has reduced antenna radiation efficiency, and the bezel is minimized. Accordingly, the wireless communication module 115 cannot be disposed on the bezel.

Therefore, a portion overlapping the wireless communication module 115 may be configured to be partially disposed of a non-metallic material, and the cover rear 102 of the metal material may be partially cut open to form a passage 205 through which a wireless signal of the wireless communication module 115 may be radiated.

Figure 4:
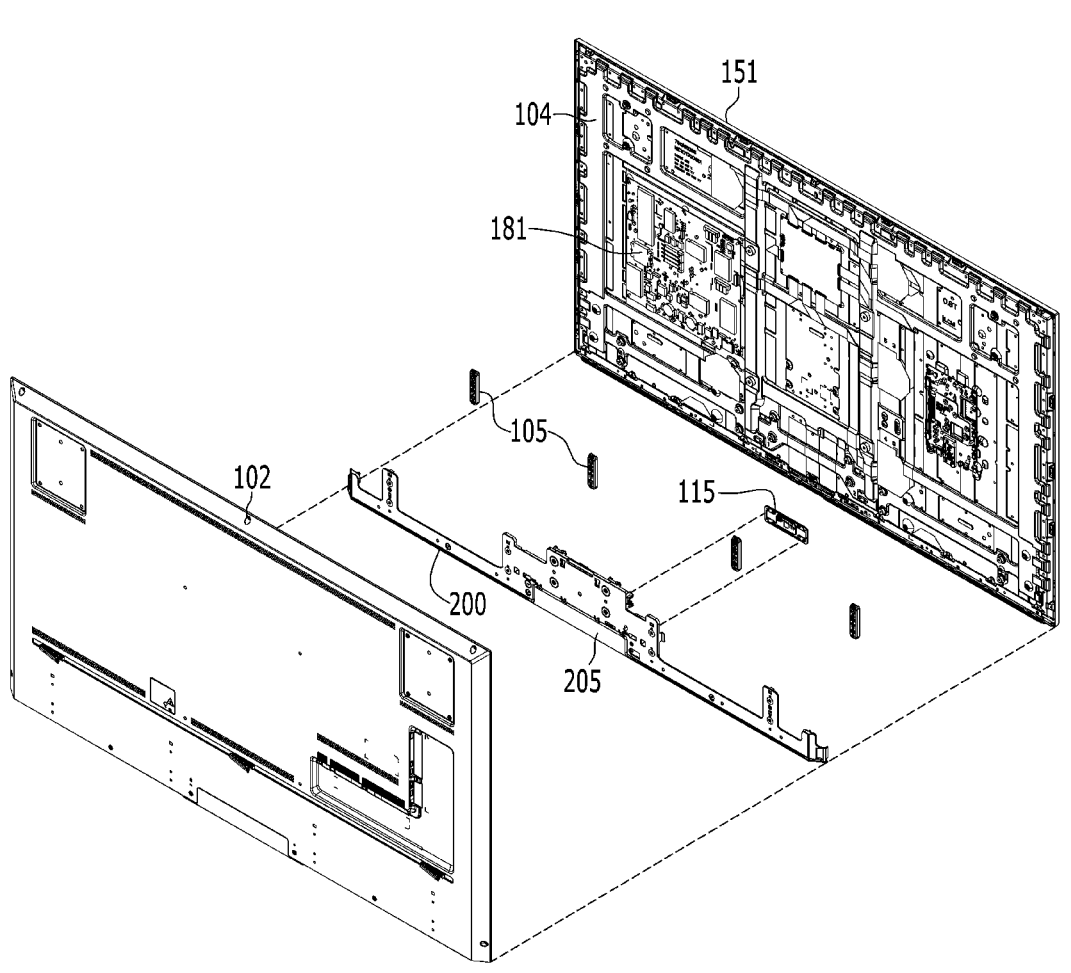
FIG. 4 is an exploded perspective view according to one embodiment of a conventional display device.

FIG. 4 is an exploded perspective view according to one embodiment of a conventional display device.

The display device 100 includes a display module 151, a cover rear 102 covering a rear surface of the display module 151, and a cover bottom 200 positioned between the display module 151 and the cover rear 102 and defining the appearance of the lower portion of the display device 100.

The display module includes the display panel 151 on which the image is output and an inner plate 104 provided to support a rear surface thereof. The two members may be bonded using an adhesive member such as an OCA.

The inner plate 104 may contain a metal material for rigidity, and various substrates may be placed on the rear surface of the inner plate 104 as a controller 180. The cover rear 102 may be coupled to the inner plate 104 to cover the substrates. The cover rear 102 may be used as an exterior member that constitutes the rear surface of the display device without further attaching a back cover.

As shown in FIG. 4, the display panel 151 including a conductive material and the cover rear 102 made of a metal material may be disposed, and a substrate as a controller for controlling the display device 100 and a wireless communication module 115 may be disposed therebetween.

The wireless communication module 115 may be disposed at an end of the display device 100 such that it can radiate signals forward. In order to ensure wireless communication coverage around the display device 100 and to minimize the impact on the backside appearance, the wireless communication module 115 may be positioned in the center of the lower portion of the rear surface of the display device 100.

Figure 5:
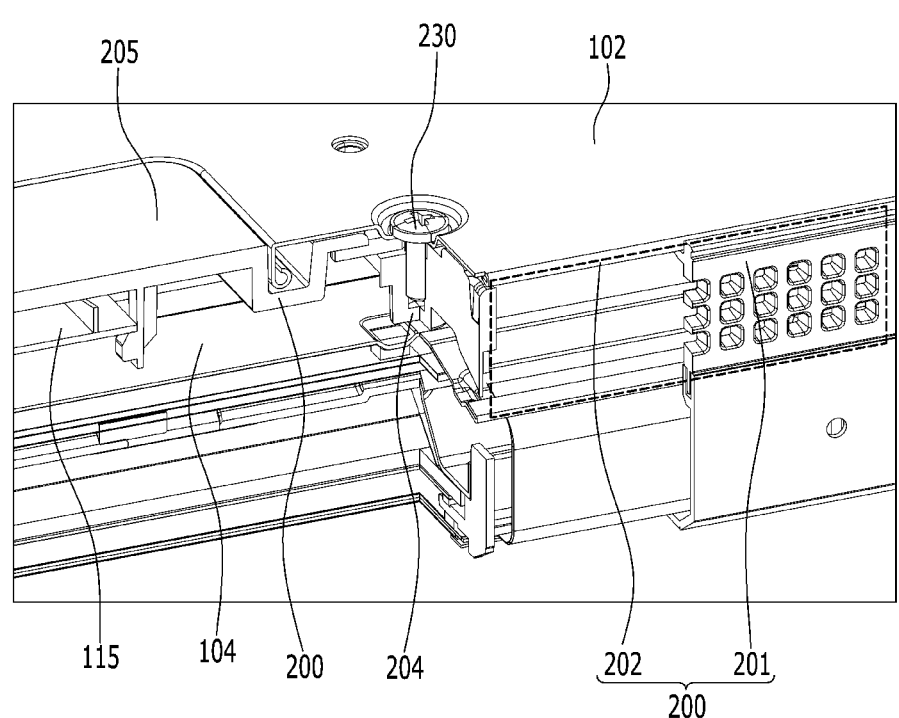
FIG. 5 is a bottom cross-sectional view of a conventional display device.

FIG. 5 is a bottom cross-sectional view of a conventional display device 100. This is a cross-sectional view of the portion corresponding to A-A of FIG. 3, illustrating the structure of the portion where the wireless communication module 115 is positioned.

The cover bottom 200 may include a bottom part 201 constituting the bottom of the display device 100, and a rear part 202 to be coupled with the cover rear 102 and the display panel 151 and to cover the rear surface of the portion where the wireless communication module 115 is positioned.

The bottom part 201 may have a plurality of heat dissipation holes formed for heat dissipation as shown in FIG. 5. The bottom part 201 may define the appearance of the bottom of the display device 100, and may have a length corresponding to the horizontal length of the display device 100.

The rear part 202 forms a back surface of the display panel 151 and the same plane as the cover rear part 102, and extends upwardly perpendicular to the bottom part 201. The rear part 202 may include a structure for coupling with the cover rear 102 and the display panel 151. As shown in FIG. 4, the area of the portion where the wireless communication module 115 is positioned may be large and the other portions may have a relatively small area.

The cover bottom 200 covers the wireless communication module 115, and the area where the wireless communication module 115 is positioned in the cover rear 102 is omitted, such that the portion 205 of the rear portion 202 of the cover bottom 200 where the wireless communication module 115 is positioned is exposed to the outside.

The screw 230 for fastening the cover rear 102 and the cover bottom 200 may be fastened to the cover bottom 200 through the cover rear 102 by arranging the cover rear 102 to overlap the rear part 202 of the cover bottom 200. To prevent the cover rear 102, which is disposed around the exposed part 205, from being detached, the fastening portion of the screw 230 may be disposed adjacent to the exposed part 205.

For the radiation performance of the wireless communication module 115, the cover bottom 200 is made of a non-conductive material, and the bottom part 201 and the exposed part 205 have no metal material. This may lead to the introduction of external static electricity.

The static electricity that is introduced into the bottom part 201 and the exposed part 205 may be directed to the cover rear 102 so as not to affect the electronic components mounted inside the display device 100. However, since the cover bottom 200, which is a non-conductive material, is disposed between the inner plate 104 and the cover rear 102, it is difficult for static electricity to flow into the cover rear 102.

The screw 230 is formed of a conductive material, but the cover bottom 200 is formed of a non-conductive material. Accordingly, static electricity introduced into the bottom part 201 or the exposed part 205 cannot be transmitted to the cover rear 102 through the screw 230.

Figure 6:
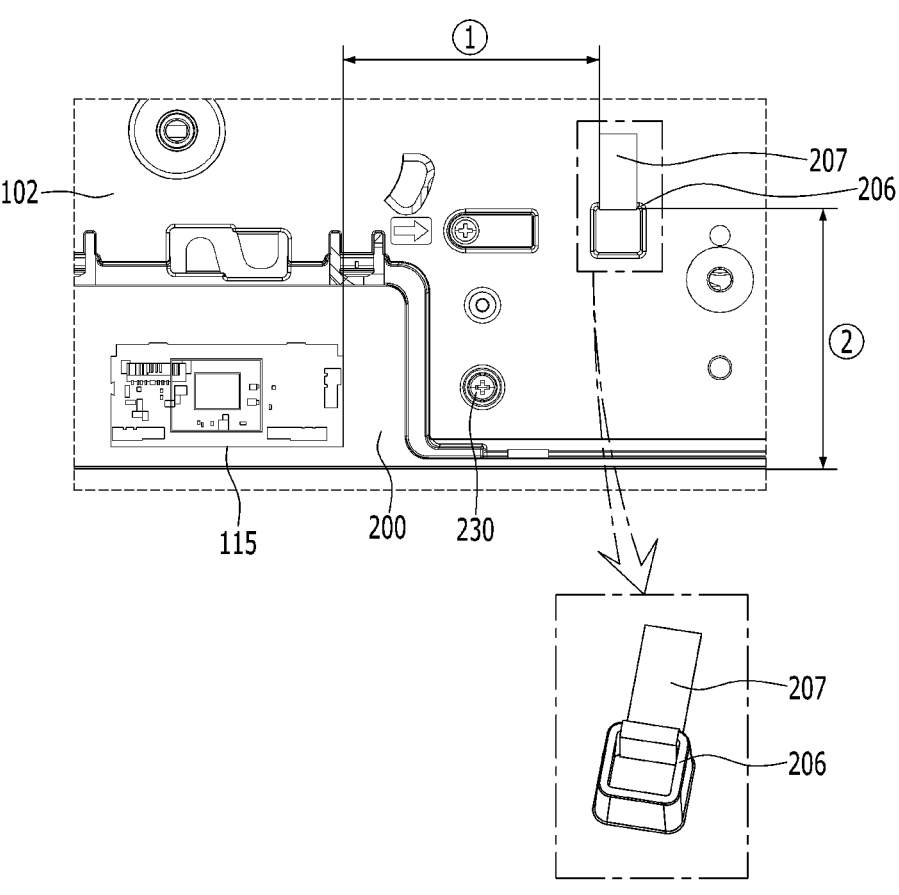
FIG. 6 is a rear view showing the conventional display device.

FIG. 6 is a rear view showing the conventional display device 100, which may include a hole 206 in the cover bottom 200 and a gasket 207 for electrical connection between the inner plate 104 and the cover rear 102.

Since it is difficult to form a hole 206 for the gasket 207 near the exposed part 205 due to a fastening structure or the like, the gasket 207 may be disposed at a position spaced apart from the wireless communication module 115 by a predetermined distance 1, 2; as shown in FIG. 6.

However, due to the long distance from the wireless communication module 115 to the gasket 207, EMI damage cannot be sufficiently prevented, and as a result, performance degradation of the wireless communication module 115 may occur due to the effect of static electricity introduced into the exposed part 205 or the bottom part 201.

Figure 7:
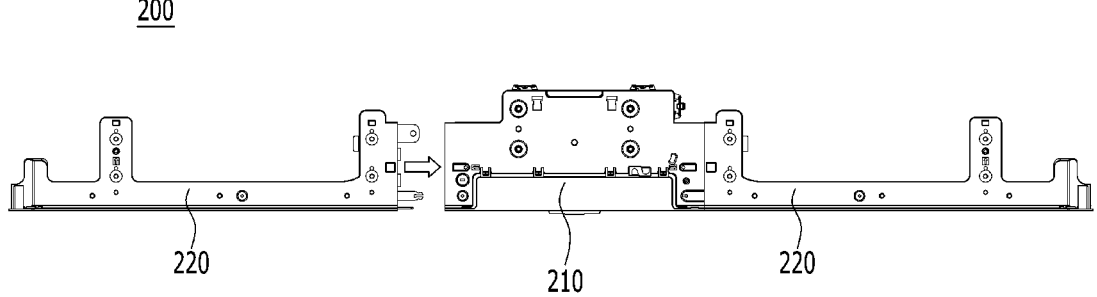
FIG. 7 is a rear view showing a cover bottom according to one embodiment of the display device of the present disclosure.

Therefore, the present disclosure employs a cover bottom 200 containing a non-metal material and a metal material to minimize damage caused by static electricity. FIG. 7 is a rear view showing the cover bottom 200 according to one embodiment of the display device 100 of the present disclosure.

The cover bottom 200 of the present disclosure may include a common part 210 formed of a non-metal material and a metallic part 220 formed of a metal material. As shown in FIG. 7, the cover bottom 200 may be configured by combining the common part 210 with the metallic part 220. The common part 210 may employ the same module and the metallic part 220 may employ modules of different lengths, making the cover bottom 200 applicable to display devices 100 of various sizes.

As the wireless communication module 115 is positioned at the center of the display device 100, the common part 210 is also positioned at the center of the cover bottom 200 and the metallic part 220 may be coupled to both sides of the common part 210. The common part 210 may include a plurality of fastening holes for coupling with the cover rear 102 while covering the wireless communication module 115.

Figure 8:
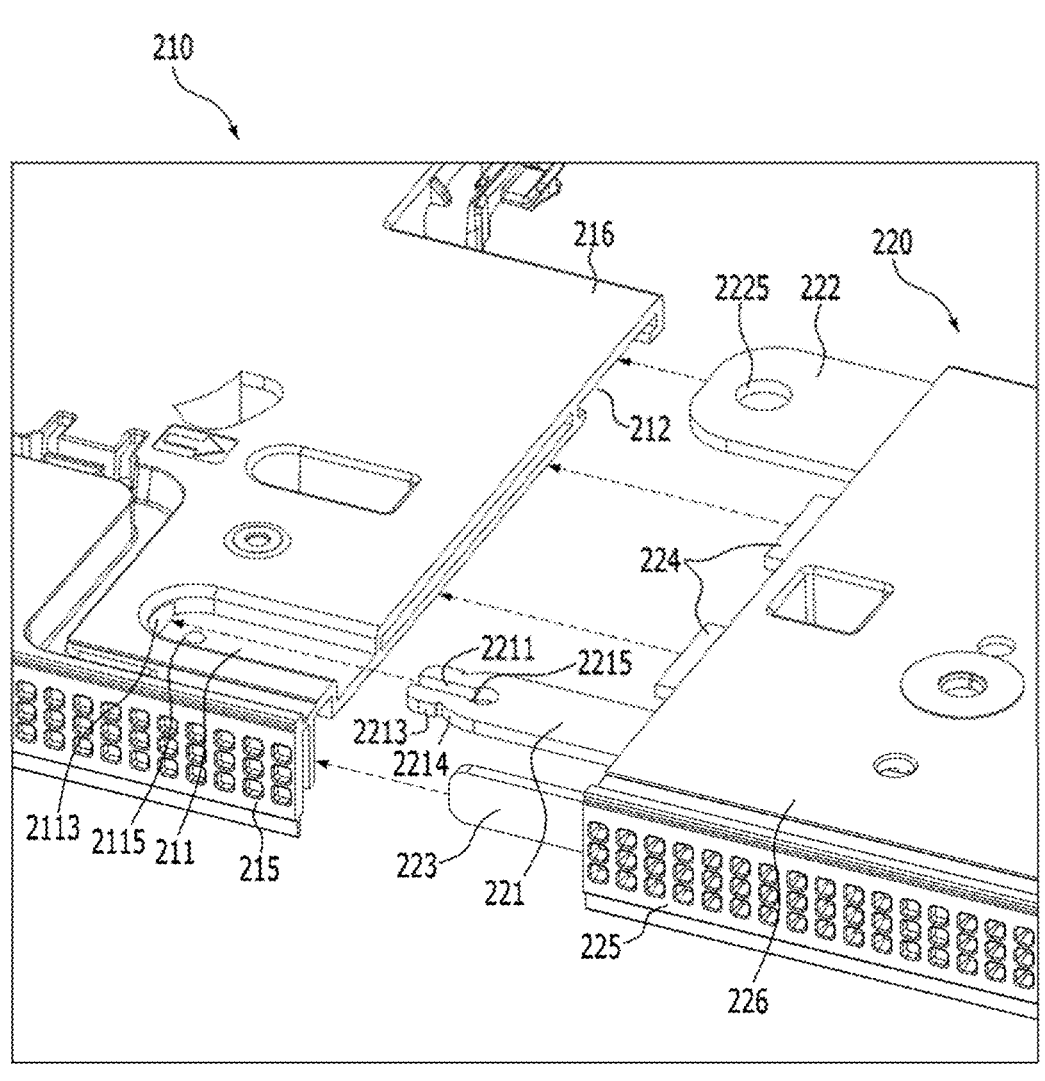
FIG. 8 is a view illustrating the coupling of a metallic part and a common part of the cover bottom according to one embodiment of the display device of the present disclosure.

FIG. 8 is a view illustrating the coupling of the common part 210 and the metallic part of the cover bottom 200 according to one embodiment of the display device 100 of the present disclosure. The common part 210 is made of a non-conductive material and may be injection molded using a resin, and the metallic part 220 includes coupling parts 221, 222, 223, and 224 that partially overlap the common part 210.

The metallic parts 220 are not necessarily symmetrically configured on both sides, and may be configured differently depending on the arrangement of the mounted components. The paired metallic parts 220 may have different shapes.

In particular, the wireless communication module 115 of the present disclosure is disposed slightly biased toward one side of the common part 210, and thus the metallic part 220 adjacent to the wireless communication module 115 needs to have a structure for EMI conduction. Therefore, the metallic parts 220 on the left and right sides may be different from each other.

The metallic parts 220 are slidably coupled to the common part 210 in a lateral direction, and the direction of sliding coupling is referred to as a first direction. For the metallic part 220 positioned on the left side of the common part 210, the first direction is to the right. For the metallic part 220 positioned on the right side, the first direction is to the left.

The common part 210) and the metallic part 220 shown in FIG. 8 are an example of the metallic part 220 on the side close to the wireless communication module 115, and the metallic part 220) on the opposite side may have a different type of coupling structure.

The metallic part 220 may include a coupling part protruding in the first direction facing the common part 210. The coupling part may be seated in a coupling groove of the common part 210 and may be disposed to overlap the coupling groove. When a pair of coupling parts and a pair of coupling grooves are provided as shown in FIG. 8, the front-to-back arrangements of the coupling grooves and the coupling parts may be different from each other to enhance the front-to-back coupling.

In the embodiment shown in FIG. 8, the first coupling part 221 is positioned behind the first coupling groove 211 and the second coupling part 222 is positioned in front of the second coupling groove 212.

The first coupling part 221 is slidably coupled to the first coupling groove in the first direction and has an end that may be inserted into a first retaining hole 2113 located at the end of the first coupling groove 211. The end of the first coupling part 221 may have first retaining protrusions 2213 protruding in the vertical direction to prevent the end of the first coupling part 221 from being displaced from the first retaining hole 2113, and may have a slop 2214 toward the end of the first coupling part 221 to facilitate insertion into the first retaining hole 2113.

The first coupling part 221 may include an elastomeric slot 2211 positioned between the pair of first retaining protrusions 2213 such that, when the end of the first coupling part 221 is inserted into the first retaining hole 2113, the gap between the pair of first retaining protrusions 2213 is narrowed to facilitate insertion into the first retaining hole 2113.

As the width of the elastic slot 2211 is reduced when the first coupling part 221 is inserted into the first retaining hole 2113, the gap between the pair of first retaining protrusions 2213 is narrowed to facilitate insertion. After the first coupling part 221 passes through the first retaining hole 2113, the elastic slot 2211 restores its original width, and the first retaining protrusions 2213 are caught in the first retaining hole 2113.

The first coupling part 221 may include a first screw hole 2215 through which a screw 230 enters, and may be disposed to be aligned with a second screw hole 2115 formed in the first coupling groove 211 of the common part 210.

The screw 230 may extend through the cover rear 102, and may be screwed into the second screw hole 2115 through the first screw hole 2215, thereby coupling the common part 210 and the metallic part 220 of the cover bottom 200 and the cover rear 102 together.

In particular, the first screw hole 2215 may be connected with the elastic slot 2211 described above to prevent the gap in the elastic slot 2211 from being narrowed when the screw 230 is inserted into the second screw hole 2115. Thus, the first retaining protrusions 2213 may be kept caught in the first retaining hole 2113.

Figure 9:
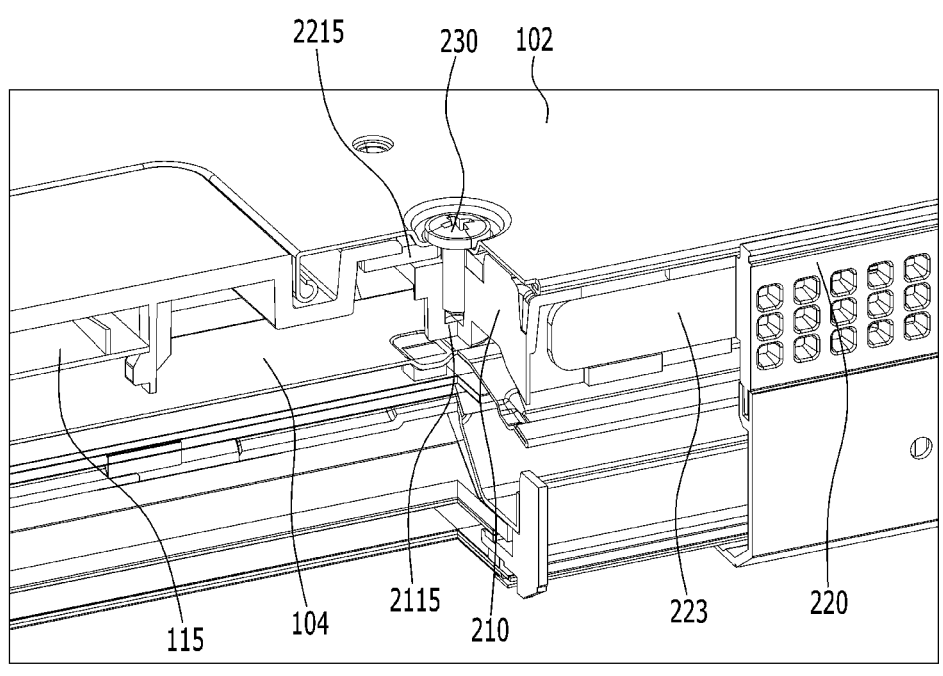
FIG. 9 is a bottom cross-sectional view according to one embodiment of the display device of the present disclosure.

FIG. 9 is a bottom cross-sectional view according to one embodiment of the display device 100 of the present disclosure, taken along line A-A of FIG. 3, which shows horizontal and vertical sectional views taken centered on the screw 230 extending through the first coupling part 221. The screw 230 contacts the cover rear 102 and the first coupling part 221 of the metallic part 220 while allowing the metallic part 220 and the cover rear 102 to be electrically connected.

In addition, as shown in FIG. 9, the bottom part 215, 225 may also block the introduction of static electricity into the metallic part 220. Static electricity introduced into the lower portion of the common part 210 may be minimized by extending the metallic part 220 to partially overlap the common part 210, thereby minimizing the introduction of static electricity into the display device 100.

Figure 10:
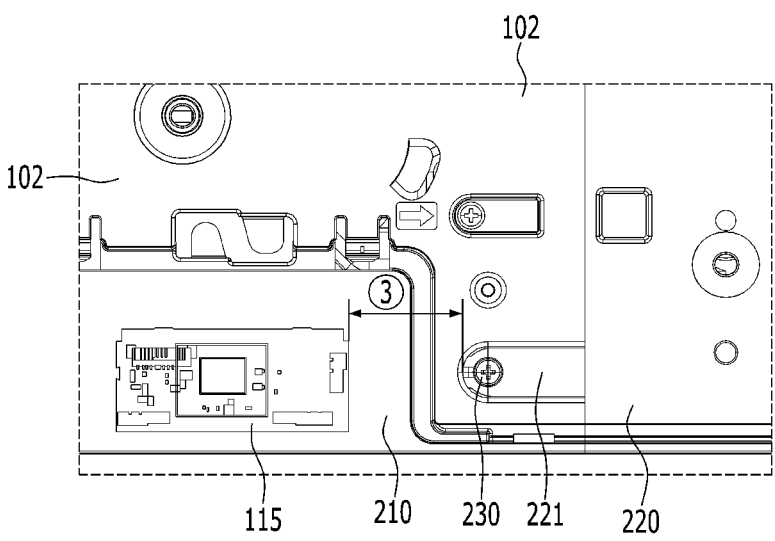
FIG. 10 is a rear perspective view illustrating the arrangement of a lower portion according to one embodiment of the display device of the present disclosure

Since the metallic part 220 is made of metal and is electrically connectable to the inner plate 104, static electricity introduced through the common part 210 may also be directed to the cover rear 102 through the metallic part 220 before the static electricity affects the wireless communication module 115 and the substrates mounted on the inner plate 104. FIG. 10 is a rear perspective view illustrating the arrangement of the lower portion of the display device 100 of the present disclosure according to one embodiment. The distance ③ between the wireless communication module 115 and the screw 230 is shorter than the distance ① between the gasket 207 of the conventional cover bottom 200 of FIG. 6 and the wireless communication module 115 (③<①).

Figure 11:
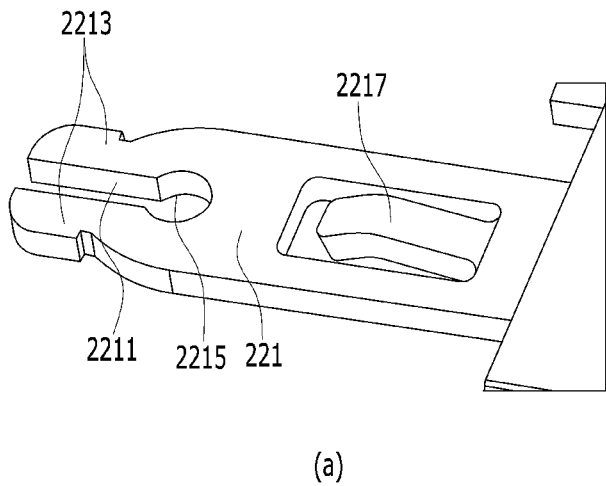
FIG. 11 is a view illustrating various embodiments of a first coupling part of the cover bottom of the display device of the present disclosure.
Figure 11:
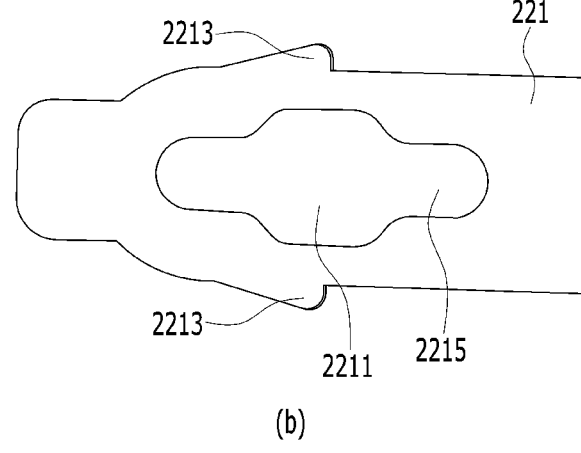

FIG. 11 is a view illustrating various embodiments of the first coupling part 221 of the cover bottom 200 of the display device 100 of the present disclosure. In the embodiment of (a) of FIG. 11, the first coupling part 221 of FIG. 8 includes a clip portion 2217. The clip portion 2217 is an elastic member that protrudes rearward toward the cover rear 102 to facilitate maintaining a connection with the cover rear 102, and may have an electrically conductive structure in addition to the electrical connection via the screw 230.

In the embodiment of (b) of FIG. 11, the first coupling part 221 is a structure with a closed end, and the length of insertion into the first retaining hole 2113 (the length from the end to the first retaining protrusion 2213) may be longer than in the embodiment of (a).

Also, since the end is not cut into the elastic slot 2211, the rigidity of the first coupling part 221 is good, but the elasticity of the elastic slot 2211, that is, the change of the gap of the elastic slot 2211, is not good. In order to secure the elasticity of the elastic slot 2211, the first retaining protrusion 2213 may be formed in the form of an expanded slot, thereby increasing the range of motion of the first retaining protrusion 2213.

Referring back to FIG. 8, since it may be difficult to secure the coupling strength between the metallic part 220 and the common part 210 with the first coupling part 221 alone, a second coupling part 222 spaced apart from the first coupling part 221 in a vertical direction may be included. The second coupling part 222 is inserted into the second coupling groove 212 and, unlike the first coupling part 221, may be positioned in front of the second coupling groove 212.

Figure 12:
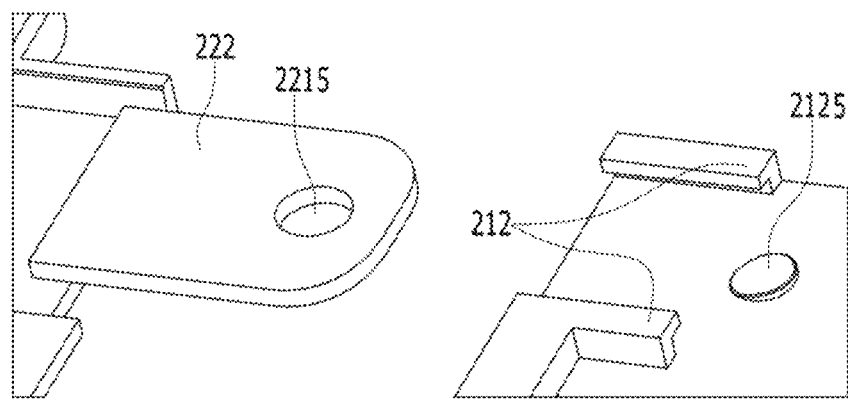
FIG. 12 is a view showing a second coupling part and a second coupling groove according to one embodiment of the display device of the present disclosure.
Figure 12:
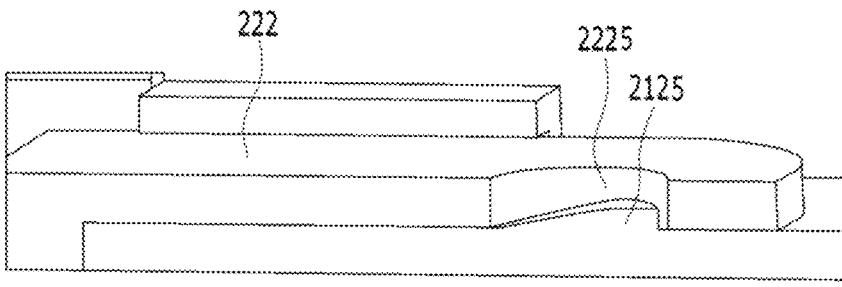

FIG. 12 is a view showing the second coupling part 222 and the second coupling groove 212 according to one embodiment of the display device 100 of the present disclosure.

The second coupling part 222 is slidably coupled to the second coupling groove 212. The second coupling groove h 212 may include a coupling rail into which the top and bottom of the second coupling part 222 are fitted so as to be guided in the first direction.

To fix the second coupling part 222 in the second coupling groove 212, the second coupling groove 212 may include a second retaining protrusion 2125 and the second coupling part 222 may include a second retaining hole 225 into which the second retaining protrusion 2125 is fitted.

The second retaining protrusion 2125 may include an inclined surface, as shown in FIG. 12, such that the second coupling part 222 may move along the inclined surface and the second retaining hole 225 may be coupled to the second retaining protrusion 2125.

As shown in FIG. 8, the third coupling part 223 disposed in the bottom part 215, 225 may widen the area of the bottom part 215, 225 of the metallic part 220 to block static electricity from being introduced into the lower end of the display device 100.

Furthermore, by arranging the third coupling part 223 to overlap the third coupling groove of the common part 210, a coupling strength between the bottom part 215, 225 of the common part 210 and the bottom part 215, 225 of the metallic part 220 may be secured.

A fourth coupling part 224 may be further provided between the first coupling part 221 and the second coupling part 222 in a protruding manner.

The first to third coupling parts 221 to 223 of the metallic part 220 have a structure capable of fixing movement of the display device 100 in the x, y, and z axis directions, and thus the common part 210 and the metallic part 220 may be firmly coupled.

Figure 13:
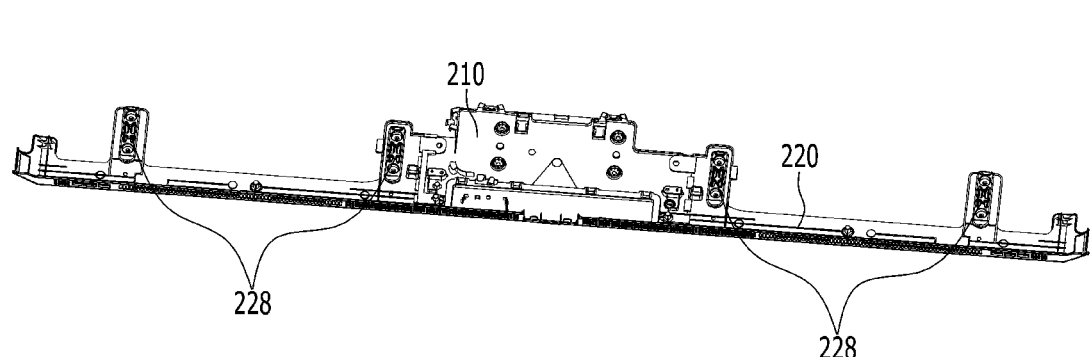
FIG. 13 is a front perspective view of a cover bottom according to one embodiment of the display device of the present disclosure.

FIG. 13 is a front perspective view of the cover bottom 200 according to one embodiment of the display device 100 of the present disclosure. The metallic part 220 may further include support protrusions 228 at the front to ensure rigidity when coupled to a bottom stand 160.

The support protrusions 228 are formed on a first portion extending upward from the metallic part 220 and may have forwardly protruding irregularities that increase the rigidity of the metallic part 220 over other portions of the metallic part 220 to provide support when the stand 160 is coupled.

Referring to FIG. 4, the conventional cover bottom 200 is constructed of an injection mold and therefore requires a separate stand supporter 105 to be coupled thereto. In the present disclosure, the cover bottom 200 is integrated with the metallic part 220 and the metallic part 220 is coupled to the common part 210, and thus the coupling of the stand supporter 106 may be omitted.

By implementing the cover bottom 200 in an assembly structure, the display device 100 of the present disclosure may improve the EMI prevention effect without interfering with wireless communications.

In addition, the assembly structure including the common part 210 and a variable part of the cover rear 102 allows the common part to be used for various models and the variable part to be replaced to apply to various models.

In addition, as the cover rear 102 contains a metal material, the cover rear is effective in improving the overall rigidity of the display device 100, and the conventionally stand supporter 105 for enhancing the rigidity when combined with the bottom stand 160 may be omitted.

Further, by applying metal materials compared to the existing structure, improvement may be achieved in terms of dimensional changes due to temperature and humidity effects, and improvement may be achieved in terms of thermal deformation-related distortion and chemical cracking.

The above embodiments are to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

What is claimed is:

1. A display device comprising:
a display panel;
an inner plate formed of a metal material and disposed on a rear surface of the display panel;
a wireless transceiver mounted on a rear surface of the inner plate;
a cover bottom arranged to cover the wireless transceiver and coupled to the rear surface of the inner plate; and
a rear cover arranged to cover the cover bottom and coupled to the rear surface of the inner plate, the rear cover containing a conductive material,
wherein the cover bottom comprises:
a first part disposed on a rear surface of the wireless transceiver, the first part containing a non-conductive material; and
a metallic part coupled to both sides of the first part and extending to a lateral end of the display panel.

2. The display device of claim 1, wherein the metallic part comprises a first coupling part arranged to overlap the first part,
the display device further comprising:
a screw fastened to the first part through the rear cover and the first coupling part.

3. The display device of claim 2, wherein the metallic part comprises:
a first coupling groove recessed to have a depth corresponding to the first coupling part; and
a first retaining hole formed on an inner side of the first coupling groove and allowing an end of the first coupling part to be inserted thereinto,
wherein the first coupling part slides along the first coupling groove in a first direction until the end of the first coupling part is inserted into the first retaining hole, such that the first coupling part is coupled with the first coupling groove.

4. The display device of claim 3, wherein the first coupling part comprises:
a screw hole allowing the screw to be inserted thereinto;
a pair of first retaining protrusions positioned to face in a first direction with respect to the screw hole and protruding in a vertical direction; and
a guide slope extending from the pair of first retaining protrusions towards the end of the first coupling part,
wherein the first retaining protrusions are caught in the first coupling groove to prevent the first coupling part from being separated from the first coupling groove.

5. The display device of claim 4, further comprising:
an elastic slot extending from the screw hole to a position between the pair of first retaining protrusions,
wherein a gap in the elastic slot is narrowed when the first retaining protrusions are inserted into the first retaining hole.

6. The display device of claim 3, wherein the metallic part comprises a second coupling part arranged to overlap the first part,
wherein the first part comprises a second coupling groove allowing a top and bottom of the second coupling part to be inserted thereinto,
wherein the first coupling groove is open in a rearward direction, and
wherein the second coupling groove is open in a forward direction.

7. The display device of claim 2, wherein the first coupling part further comprises a clip portion protruding rearward to contact the rear cover.

8. The display device of claim 1, wherein the metallic part comprises a second coupling part arranged to overlap the first part, wherein the first part comprises:

a second coupling groove allowing a top and bottom of the second coupling part to be inserted thereinto; and a coupling rail formed on an upper and lower side of the second coupling groove to allow top and bottom of the second coupling part to be movably inserted thereinto.

9. The display device of claim 8, further comprising:

a second retaining protrusion protruding from the second coupling groove in a thickness direction, wherein the second coupling part comprises a second retaining hole allowing the second retaining protrusion to be inserted thereinto.

10. The display device of claim 1, wherein the metallic part comprises:

a rear part disposed inside the rear cover;

a bottom part arranged to cover a lower end of the display device; and a support protrusion comprising irregularities protruding forward from the rear part, wherein the support protrusion comprises a plurality of support protrusions formed on the metallic part.

11. The display device of claim 10, wherein a vertical length of first portions of the rear part having the support protrusion is greater than a vertical length of a second portion the rear part positioned between the first portions.

12. The display device of claim 10, further comprises:

a third fastening protrusion protruding from the bottom part and arranged to overlap the first part.

13. The display device of claim 1, wherein the wireless transceiver comprises at least one of a Bluetooth or Wi-Fi transceiver configured to perform short-range wireless communication.

\* \* \* \* \*